(12) United States Patent
Sodano et al.

(10) Patent No.: US 10,202,484 B2
(45) Date of Patent: Feb. 12, 2019

(54) SHAPE-MEMORY-SELF-HEALING POLYMERS (SMSHPS)

(71) Applicant: University of Florida Research Foundation, Inc., Gainesville, FL (US)

(72) Inventors: Henry A. Sodano, Ann Arbor, MI (US); Yunseon Heo, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 67 days.

(21) Appl. No.: 15/157,839

(22) Filed: May 18, 2016

(65) Prior Publication Data

US 2017/0008998 A1    Jan. 12, 2017

Related U.S. Application Data

(63) Continuation-in-part of application No. PCT/US2014/064986, filed on Nov. 11, 2014.
(Continued)

(51) Int. Cl.
    *C08G 18/38* (2006.01)
    *C08G 18/32* (2006.01)
    (Continued)

(52) U.S. Cl.
    CPC ..... *C08G 18/3846* (2013.01); *C08G 18/0895* (2013.01); *C08G 18/3206* (2013.01);
    (Continued)

(58) Field of Classification Search
    CPC ............ C08G 18/3846; C08G 18/0895; C08G 18/7893; C08G 18/3819; C08G 18/3206;
    (Continued)

(56) References Cited

U.S. PATENT DOCUMENTS 3,890,253 A   6/1975  Takeshita et al.
4,705,721 A  11/1987  Frisch et al.
(Continued)

FOREIGN PATENT DOCUMENTS

WO   WO 2010/128007   11/2010
WO   WO 2012/031824    3/2012
(Continued)

OTHER PUBLICATIONS

Diakoumakos, C.D. et al. "Polyimides derived from Diels-Alder polymerization of furfuryl-substituted maleamic acids or from the reaction of bismaleamic with bisfurfurylpyromellitamic acids," *Journal of Polymer Science Part A: Polymer Chemistry*, Nov. 1992, pp. 2559-2567, vol. 30, Issue 12.
(Continued)

*Primary Examiner* — Michael L Leonard
(74) *Attorney, Agent, or Firm* — Timothy H. Van Dyke; Beusse, Wolter, Sanks & Maire PLLC

(57) ABSTRACT

A shape-memory self-healing polymeric network (SMSHP) is useful as a molded part, a coating, or as a matrix for a composite that can be repaired by heating to a controlled temperature. The SMSHP has thermally reversible repeating units where a thermally reversible adduct is situated between two common linking units formed during a polymerization process between thermally reversible monomers and cross-linking monomers. Optionally, other repeating units can be present from other monomers. Shape-memory results when the SMSHP is warmed to a temperature in excess of its glass transition temperature and self-healing then proceeds when a higher temperature is achieved where thermally reversible adducts dissociates to complementary groups that subsequently reform the adduct without distortion of the memorized shape. The thermally reversible adducts can be Diels-
(Continued)

US 10,202,484 B2
Page 2

Alder (DA) adducts in a polyurethane, poly urea, or amine epoxy SMSHP network.

16 Claims, 10 Drawing Sheets

Related U.S. Application Data

(60) Provisional application No. 61/905,552, filed on Nov. 18, 2013.

(51) Int. Cl.
| | |
|---|---|
| C08G 18/08 | (2006.01) |
| C08G 18/78 | (2006.01) |
| C08J 5/04 | (2006.01) |
| C08J 5/18 | (2006.01) |
| C09D 175/04 | (2006.01) |

(52) U.S. Cl.
  CPC ..... *C08G 18/3278* (2013.01); *C08G 18/3819* (2013.01); *C08G 18/7893* (2013.01); *C08J 5/042* (2013.01); *C08J 5/18* (2013.01); *C09D 175/04* (2013.01); *C08G 2280/00* (2013.01); *C08J 2375/04* (2013.01)

(58) Field of Classification Search
  CPC ...... C08G 18/3228; C09D 175/04; C08J 5/18; C08J 5/042
  See application file for complete search history.

(56) References Cited

U.S. PATENT DOCUMENTS

| | | | |
|---|---|---|---|
| 6,759,481 B2 | 7/2004 | Tong | |
| 6,933,361 B2 | 8/2005 | Wudl et al. | |
| 6,986,855 B1 | 1/2006 | Hood et al. | |
| 7,276,195 B1 | 10/2007 | Tong | |
| 7,422,714 B1 | 9/2008 | Hood et al. | |
| 8,980,999 B2 | 3/2015 | Schmidt et al. | |
| 2003/0032758 A1 | 2/2003 | Harris et al. | |
| 2004/0014933 A1 | 1/2004 | Wudl et al. | |
| 2009/0247694 A1 | 10/2009 | Kritzer et al. | |
| 2010/0240841 A1* | 9/2010 | Shimura | C08G 18/10 525/450 |
| 2013/0059988 A1 | 3/2013 | Palmese et al. | |
| 2013/0303678 A1* | 11/2013 | Hilf | C08F 2/60 524/518 |
| 2015/0299363 A1* | 10/2015 | Barner-Kowollik | C09D 4/00 524/547 |

FOREIGN PATENT DOCUMENTS

| | | |
|---|---|---|
| WO | WO 2012/127418 | 9/2012 |
| WO | WO 2013/170313 | 11/2013 |

OTHER PUBLICATIONS

Kuramoto, N. et al. "Thermoreversible reaction of Diels-Alder polymer composed of difurufuryladipate with bismaleimidodiphenylmethane," *Journal of Polymer Science Part A: Polymer Chemistry*, Oct. 1994, pp. 2501-2504, vol. 32, Issue 13.
Liu, Y-L., et al. "Crosslinked epoxy materials exhibiting thermal remendablility and removability from multifunctional maleimide and furan compounds," *Journal of Polymer Science Part A: Polymer Chemistry*, Jan. 15, 2006, pp. 905-913, vol. 44, Issue 2.
Stevens, M.P., et al. "Crosslinking of polystyrene via pendant maleimide groups," *Journal of Polymer Science: Polymer Chemistry Edition*, Nov. 1979, pp. 3675-3685, vol. 17, Issue 11.
Chen, X. et al., "A Thermally Re-mendable Cross-Linked Polymeric Material," *Science*, Mar. 1, 2002, pp. 1698-1702, vol. 295.
Chen, X. et al., "New Thermally Remendable Highly Cross-Linked Polymeric Materials," *Macromolecules*, 2003, pp. 1802-1807, vol. 36.
Chujo, Y. et al., "Reversible Gelation of Polyoxazoline by Means of Diels-Alder Reaction," *Macromolecules*, 1990, pp. 2636-2641, vol. 23.
Diakoumakos, C.D. et al., "Heat-Resistant Resins Derived From Cyano-Substituted Diels-Alder Polymers," *Eur. Polym. J.*, 1994, pp. 465-472, vol. 30, No. 4.
Du, P. et al., "Synthesis and characterization of linear self-healing polyurethane based on thermally reversible Diels-Alder reaction," *RSC Adv.*, 2013, pp. 15475-15482, vol. 3.
Gandini, A., "The Application of the Diels-Alder Reaction to Polymer Syntheses Based on Furan/Maleimide Reversible Couplings," *Polimeros: Ciencia e Tecnologia*, 2005, pp. 95-101, vol. 15, No. 2.
Gandini, A., "The furan/maleimide Diels-Alder reaction: A versatile click-unclick tool in macromolecular synthesis," *Progress in Polymer Science*, 2013, pp. 1-29, vol. 38.
Gheneim, R. et al., "Diels-Alder Reactions with Novel Polymeric Dienes and Dienophiles: Synthesis of Reversibly Cross-Linked Elastomers," *Macromolecules*, 2002, pp. 7246-7253, vol. 35.
Ghosh, B. et al., "Self-Repairing Oxetane-Substituted Chitosan Polyurethane Networks," *Science*, Mar. 13, 2009, pp. 1458-1460, vol. 323.
Goussé, C. et al., "Application of the Diels-Alder Reaction to Polymers Bearing Furan Moieties. 2. Diels-Alder and Retro-Diels-Alder Reactions Involving Furan Rings in Some Styrene Copolymers," *Macromolecules*, 1998, pp. 314-321, vol. 31.
Goussé, C. et al., "Diels-Alder polymerization of difurans with bismaleimides," *Polym Int*, 1999, pp. 723-731, vol. 48.
Heo, Y., "Self-Healing Polymers With Thermo-Responsive Shape Memory Properties," A candidacy examination presented to the graduate school of the University of Florida in partial fulfillment of the requirements for the degree of Doctor of Philosophy, 2013, pp. 1-41.
Heo, Y. et al., "Self-Healing Polyurethanes with Shape Recovery," *Adv. Funct. Mater.*, 2014, pp. 5261-5268, vol. 24.
Heo, Y. et al., "Thermally responsive self-healing composites with continuous carbon fiber reinforcement," *Composites Science and Technology*, 2015, pp. 244-250, vol. 118.
Imai, Y. et al., "Thermally Reversible IPN Organic-Inorganic Polymer Hybrids Utilizing the Diels-Alder Reaction," *Macromolecules*, 2000, pp. 4343-4346, vol. 33.
Inglis, A.J. et al., "Ultrafast Click Conjugation of Macromolecular Building Blocks at Ambient Temperature," *Angew. Chem. Ing. Ed.*, 2009, pp. 2411-2414, vol. 48.
Inglis, A.J. et al., "Ambient Temperature Synthesis of a Versatile Macromolecular Building Block: Cyclopentadienyl-Capped Polymers," *Macromolecules*, 2010, pp. 33-36, vol. 43.
Jones, J.R. et al., "Cross-Linking and Modification of Poly(ethylene terephthalate-co-2,6-anthracenedicarboxylate) by Diels-Alder Reactions with Maleimides," *Macromolecules*, 1999, pp. 5786-5792, vol. 32.
Kersey, F.R. et al., "A hybrid polymer gel with controlled rates of cross-link rupture and self-repair," *J.R. Soc. Interface*, 2007, pp. 373-380, vol. 4.
Kwart, H. et al., "Isomerism and Adduct Stability in the Diels-Alder Reaction. I. The Adducts of Furan and Maleimide," *J. Am. Chem. Soc.*, Jun. 20, 1952, pp. 3094-3097, vol. 74, No. 12.
Lendlein, A. et al., Shape-Memory Polymers, *Angew. Chem. Int. Ed.*, 2002, pp. 2034-2057, vol. 41.
Liu, Y-L. et al., "Thermally Reversible Cross-Linked Polyamides with High Toughness and Self-Repairing Ability from Maleimide- and Furan Functionalized Aromatic Polyamides," *Macromolecular Chemistry and Physics*, 2007, pp. 224-232, vol. 208.
Liu, Y-L. et al., "Self-healing polymers based on thermally reversible Diels-Alder chemistry," *Polym. Chem.*, 2013, pp. 2194-2205, vol. 4.
Liu, X. et al., "Kinetic study of Diels-Alder reaction involving in malemide-furan compounds and linear polyurethane," *Polym. Bull.*, 2013, pp. 2319-2335, vol. 70.

(56) References Cited

OTHER PUBLICATIONS

Luo, X. et al., "Shape Memory Assisted Self-Healing Coating," *ACS Macro Lett.*, 2013, pp. 152-156, vol. 2.

McElhanon, J.R. et al., Thermally Responsive Dendrons and Dendrimers Based on Reversible Furan-Meleimide Diels-Alder Adducts, Organic Letters, 2001, pp. 2681-2683, vol. 3, No. 17.

Mikroyannidis, J.A., "Furyl-Maleimide in situ Generated AB-Monomers: Synthesis, Characterization, and Diels-Alder Polymerization," *Journal of Polymer Science: Part A: Polymer Chemistry*, 1992, pp. 2017-2024, vol. 30.

Peterson, A.M. et al., "Reversibly Cross-Linked Polymer Gels as Healing Agents for Epoxy-Amine Thermosets," *Applied Materials & Interfaces*, 2009, pp. 992-995, vol. 1, No. 5.

Syrett, J.A. et al., Self-healing and self-mendable polymers, *Polymer Chemistry*, 2010, pp. 978-987, vol. 1.

Tesoro, G.C. et al., "Synthesis of Siloxane-Containing Bis(furans) and Polymerization with Bis(maleimides)," *Ind. Eng. Chem. Prod. Res. Dev.*, 1986, p. 444-448, vol. 25.

Wang, H.P. et al., "Self-Healing of Thermoplastics via Living Polymerization," *Macromolecules*, 2010, pp. 595-598, vol. 43.

Wu, D.Y. et al., "Self-healing polymeric materials: A review of recent developments," *Prog. Polym. Sci.*, 2008, pp. 479-522, vol. 33.

Xu, W. et al., "Constitutive modeling of shape memory polymer based self-healing syntactic foam," *International Journal of Solids and Structures*, 2010, pp. 1306-1316, vol. 47.

Yang, Y. et al., "Self-healing polymeric materials," *Chem. Soc. Rev.*, 2013, pp. 7446-7467, vol. 42.

Zhang, J. et al., "Self-healable and recyclable triple-shape PPDO-PTMEG co-network constructed through thermoreversible Diel-Adler reaction," *Polym. Chem.*, 2012, pp. 1390-1393, vol. 3.

Zhang, Y. et al., "Thermally Self-Healing Polymeric Materials: The Next Step to Recycling Thermoset Polymers?," Macromolecules, 2009, pp. 1906-1912, vol. 42.

\* cited by examiner

HDI Biuret

HDI Isocyanurate n = 0 to 4

Polymeric MDI

TDI-trimethylolpropane adduct

Isocyanurate of IPDI

SHAPE-MEMORY-SELF-HEALING POLYMERS (SMSHPS)

CROSS-REFERENCE TO RELATED APPLICATION

This application is a continuation-in-part of International Application No. PCT/US2014/064986, filed Nov. 11, 2014, which claims the benefit of U.S. Provisional Application Ser. No. 61/905,552, filed Nov. 18, 2013, which is hereby incorporated by reference herein in its entirety, including any FIGS., tables, or drawings.

This invention was made with government support under W911NF-12-1-0014 awarded by the Army Research Office. The government has certain rights in the invention.

BACKGROUND OF INVENTION

Polymeric materials have been widely used in devices for transportation, sports and recreation, construction, coatings, and other pursuits where the materials are in an environment where they may experience mechanical, chemical, radiative, thermal and other stress. These stresses lead to damage that range from large wounds to micro-cracks that can be difficult to detect and not readily reparable. Not only can the aesthetic qualities of the material be compromised by this damage, but the function lifetime of the device can be diminished. This damage need not be at the exposed surfaces of the device or in the bulk or continuous phase of a polymeric material, but can exist at an interface of a second material, such as a supporting surface or a reinforcing filler phase of a composite.

To this end, materials that can recover mechanical properties are advantageous. A self-healing polymer (SHP) has the potential to repair a wound and prevent the propagation of cracks or other wounds at the micro scale. To achieve this self-healing, two approaches have been pursued. In the first approach, self-healing results from the incorporation of micro-encapsulated uncured resin as a homogeneously distributed filler phase. Fracture of the material is intended to cause rupture of the micro-capsules with the release of resin whose polymerization repairs the fracture. A catalyst that is in the polymer phase, but is immobile or impermeable to the capsules, is also included in many formulations of these micro-capsule filled polymeric materials. In the second approach, reversible bonds are included in the self-healing polymeric material. The reversible bonds allow local remodeling of the damaged material.

Self-healing reversible bonds have most frequently been formed by the Diels-Alder (DA) cycloaddition reaction, which is a thermo-reversible reaction. DA reactions do not require additional chemicals, such as catalysts. The DA reaction is a concerted reaction between a four-$\pi$-electron system, for example, a 1,3-diene, with a 2-n-electron system, a dieneophile, for example, an alkene. There are numerous examples in the literature of the preparation of self-healing polymers where the diene or dieneophile is situated on the terminal ends of a polymer, as pendent groups on a polymer chain, or are used as complementary functionality for the formation of a step-growth polymer from a bis-diene monomer and a complementary bis-dieneophile monomer or from an asymmetric monomer having a diene at one position and a dieneophile at another position of the monomer. Being a concerted reaction, there is no intermediate, for example, a radical or ionic species, in the DA reaction that can cause unwanted side-reactions.

The most frequently employed diene and dieneophile pair is that of furan and maleimide, respectively. The diene of the cyclic furan moiety is frozen in an s-cis conformation within the ring. The s-cis conformation is required for the concerted reaction. The maleimide provides a very reactive dieneophile due to the electron withdrawal carbonyl groups thereon. Polymers made in this fashion typically do not have a high degree of polymerization (DP) and the nature of the polymerization process affects the DP obtained. Typically, polymerization is carried out at temperatures in excess of 90° C. The step-growth polymerization using DA cycloaddition reactions has been performed with multi-maleimide monomers with multi-furanyl monomers. The resulting networks are highly cross-linked and display self-healing properties. Fracture of these polymers often occur where the imposed bond breaking occurs by the retro-Diels-Alder (RDA) reaction rather than cleavage of other covalent bonds, as the enthalpy of the RDA reaction is approximately 96 kJ/mol, as opposed to a normal C—C bond energy of approximately 350 kJ/mol. When the polymer or network is wounded, typically there is a separation of the fractured surfaces that requires a mechanical forcing of the fractured surfaces to be placed into intimate contact.

Shape-memory polymers (SMPs), more specifically thermo-responsive shape memory polymers, are relatively lightly cross-linked networks where the shape of the original cross-linked network can be modified when the polymer is deformed at a temperature above its glass-transition temperature ($T_g$) and the deformed shape is maintained while the temperature is reduced below the $T_g$. The SMP can then be heated above the $T_g$ and the original shape restored and subsequently maintained upon cooling below the $T_g$. Hence a polymeric system that can combine the properties of SMPs into SHPs would be advantageous for many devices and coatings that are employed where wounds to the polymeric material comprising the device or coating occur under normal use.

DETAILED DISCLOSURE

Figure 1:
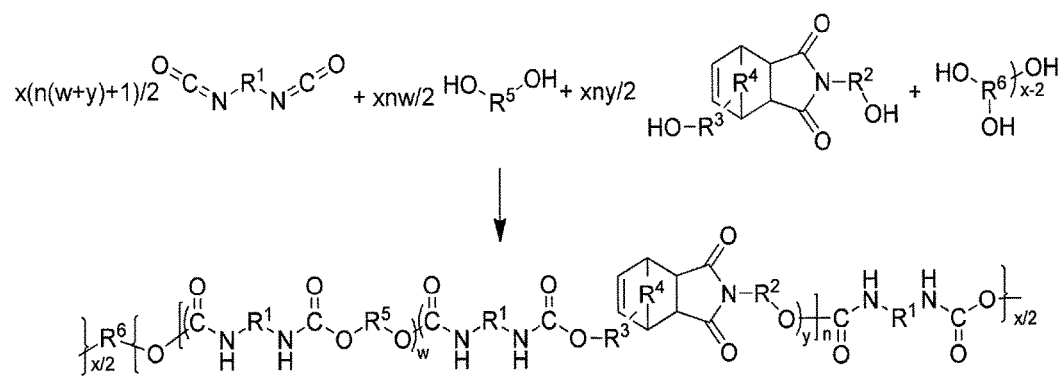
FIG. 1 shows a reaction scheme for the preparation of a shape-memory-self-healing polymer (SMSHP) where a polyurethane network is prepared from a diisocyanate, a Diels-Alder (DA) adduct diol, a second diol, and an x-functional polyol crosslinking site, according to an embodiment of the invention.

Embodiments of the invention are directed to shape-memory polymers (SMPs) that are self-healing and the preparation of these polymers by reactive molding or by a coating process. These shape-memory-self-healing polymers (SMSHPs) are cross-linked to a degree that they act as an elastomer when above their glass-transition temperature ($T_g$) but have the properties of a resin, similar to a ridged thermo-plastic below the $T_g$. Although embodiments of invention will be illustrated and disclosed in relation to exemplary polyurethane based SMSHPs, the invention is not so limited, as can be appreciated by one of ordinary skill in the art. In embodiments of the invention, the SMSHPs are cross-linked polyurethanes or other step-growth polymers having repeating units that include a DA adduct, but where the cross-linking sites are not DA adducts. In this manner, upon warming above the $T_g$, no cross-links are cleaved which inhibits a permanent distortion of the shape that can accompany loss of the cross-links. The $T_g$ is less than the temperature where the RDA reaction readily occurs. In this manner, a wounded device or coating can be locally heated to a temperature above the $T_g$ permitting the original shape to be regenerated and upon subsequent heating to a temperature sufficient to promote the RDA reaction, and the equilibrium between the diene and dienophile and the DA adduct, which allows healing of the wound with no imposed external mechanical force being applied to the device or coating.

The SMSHPs are networks where cross-linking repeating units are situated between chains; the majority of these chains contain at least one thermally reversible repeating unit. The thermally reversible units are incorporated by coupling functionalities that are formed upon polymerization to the network, where the coupling functionality is not a thermally reversible unit under the conditions that a device prepared as the SMSHP network is used. Under the conditions where the device is employed, the temperature is below the $T_g$ of the SMSHP and the majority of the thermally reversible units are in the form of an adduct. At temperatures that exceed the $T_g$, generally, but not necessarily, significantly in excess of the $T_g$, for example, 10, 15, 20, 25, 30, 35, 40, 45, 50, 55, 60, 70, 80, 90, or 100° C. above the $T_g$, the adduct cleaves to a disconnected pair of complementary functionality. At a temperature intermittent to the $T_g$ and the cleavage or dissociation temperature, the addition occurs.

For example, the polyurethanes are prepared from a mixture of monomers including one or more difunctional monomers with alcohol and/or isocyanate functionalities that contain a DA adduct. These monomers need only be monomeric with respect to the polymerization reaction by which the final SMSHP is formed, and may be oligomeric in nature or polymeric in nature as long as they can be employed as a neat liquid at temperatures below a temperature where the RDA reaction dominates the equilibrium driving DA adducts to dissociated dienes and dieneophiles. In an embodiment of the invention, the monomers can be monomeric, oligomeric or polymeric and the polymerization reaction is the coupling of the monomers with cross-linking monomers. The mixture of monomers is combined in a fluid state at temperatures below a temperature where the RDA reaction occurs readily, for example, below a temperature of about 70° C. when the RDA occurs readily at 120° C. Depending on the choice of monomers and the structure of the DA adduct, the temperature of polymerization and curing and the temperature that promotes the RDA reaction can vary significantly, as can be appreciated by one of ordinary skill in the art. The polymerization and cross-linking of the material is carried out at a temperature that the RDA does not limit the DP of the cured SMSHP when polymerization is carried out to high conversion, for example, essentially complete or equilibrium concentrations of unreacted end-groups during the non-DA step-growth addition reaction. The polymerization can be performed at temperatures below, equal to, or above the $T_g$ of the polymer as long as a sufficient DP is achieved and the material is effectively a cross-linked network with sufficient structural integrity to act as the desired device or coating. The cross-linked density can vary according to the needs of the device as long as the material retains a $T_g$ sufficiently lower than the temperature where the RDA reaction effectively melts the SMSHP where loss of the shape-memory properties occurs because flow deforms the shape and the device is irreparably deformed. In this manner, the connectivity of the network can be maintained because cross-linking sites are essentially fixed to restrict the positions of the diene and dienophile in a volume of the network that promotes their contact to restore the DA adduct when the temperature promotes DA adduct formation and is above the $T_g$ of the SMSHP.

In an embodiment of the invention, the monomers can be those employed in a step-growth addition polymerization process, such as in the preparation of polyurethanes. In embodiments of the invention, the cross-linking monomer can be trifunctional, tetrafunctional, or higher functionality monomers. For example, in a polyurethane polymerization, the cross-linking monomer can be a triol, tetraol, pentaol, hexaol or large polyol. In an embodiment of the invention, reactive injection molding of a device can be carried out at a temperature below the effective onset of the RDA reaction but where the molecular weight building reaction can proceed to the extent required to form the network.

In an embodiment of the invention, the polyurethane or other step-growth addition polymer can be employed as the polymer matrix of a composite. The composite can be filled with particulate fillers, fibers, fabrics, graphene, or any other form of filler. Fillers can be nanomaterials, such as nanorods, nanotubes, nanoplates, or other forms of nanomaterials. The composite can be an advanced carbon fiber reinforced polymer (CFRP) composite, with high specific strength and stiffness. The CFRP composite can provide devices for energy efficiency due to lower weight for use in aircraft, automobiles, and high performance sporting goods. Other fibers, such as metal, alloy, glass, ceramic, or organic polymer fibers can be used for reinforcement of composites. The fibers can be surface functionalized with agents to bind with the polymer matrix. The functionalizing agents can have units for DA reactions within the agent.

In another embodiment of the invention, the device is a coating and not a molded device. As a coating the device can be formed from solution or from a neat liquid of the monomers. The solvent of the solution is volatile under the conditions that the coating is formed; for example, the coating can be formed from solution at ambient temperature and the solvent is an organic solvent that has a boiling point below 100° C. In an embodiment of the invention, as a coating, a step-growth condensation polymerization can be employed in addition to or rather than a step-growth addition polymerization, where a volatile molecule can be coproduced as a by-product that readily diffuses from the coated surface, and the monomers can be provided in a volatile solvent. In another embodiment of the invention, an uncross-linked polymer can be in a melt state without significant RDA reaction; injection molded and subsequent cross-linked by reactions between functionality and complementary functionality on pendant groups of the polymer or, optionally, with complementary functionality on dissolved small molecules. In embodiments of the invention, the DA reaction is not the molecular weight determining reaction. This permits formation of polymers with much higher extents of reaction than those which have been observed for DA polymerizations, which, generally, produce DPs below 20. The resins and coating produced, according to embodiments of the invention, have properties that are competitive to those displayed by resins currently employed in various transportation, sports and recreation, and construction applications.

In embodiments of the invention, the proportion of DA adduct comprising monomers can vary to achieve the amount of chain-cleavage by the RDA reaction that is needed for self-healing at a practical temperature. For example with a higher $T_g$ SMSHP, a lower proportion of DA adduct repeating units relative to cross-linking sites can be desirable in the network and a higher functionality of cross-linking sites can be advantageous. For example, in an embodiment of the invention, the self-healing temperature is one that permits a sufficient number of DA adducts to be dissociated by the RDA reaction but where no more than x−2 of the chains between x-functional cross-links are dissociated to diene and dieneophile. In this manner, negligible flow can occur during repair, and the shape is effectively retained upon healing. Optimal repair occurs when heating is carried out such that the shape-memory of the SMSHP is invoked at a temperature above the $T_g$ but the temperature is not that where the RDA reaction dominates the equilibrium between the DA adduct and the diene and dieneophile therefrom.

Figure 2:
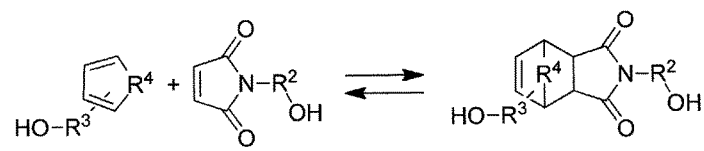
FIG. 2 shows a reaction scheme for the preparation of a DA adduct diol, according to an embodiment of the invention.

In an embodiment of the invention, the SMSHP is a polyurethane that includes at least one diol DA adduct of a cyclic diene and the dieneophile maleimide, at least one diisocyanate, optionally, one or more additional diols and cross-linking a multi-functional alcohol monomer or multi-functional isocyanate monomer. The preparation of a SMSHP is shown in FIG. 1. In this exemplary embodiment of the invention. The DA adduct,

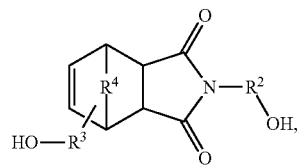

is the DA reaction product, as shown in FIG. 2, of the diene,

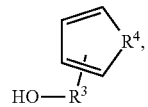

and the dieneophile,

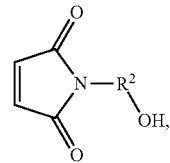

where: $R^2$ and $R^3$ are linear, branched, or cyclic $C_1$-$C_{20}$ alkylene groups, optionally interrupted by one or more oxygen, carbonyl, ester, and/or $[Si(CH_3)_2O]_zSi(CH_3)_2$ groups; and $R^4$ is O, $CH_2$, $C_2H_4$, NH, $CH_2NH$, where any of the hydrogens may be substituted by a $C_1$-$C_{20}$ alkyl group, optionally interrupted by one or more oxygen, carbonyl, ester, and/or $[Si(CH_3)_2O]_zSi(CH_3)_2$ groups, where z is 1 to 20, wherein any one of the hydrogens of the diene unit, including any hydrogen of the $R^4$ portion, may be substituted with the $R^3OH$ group, such that the $R^3OH$ group can be on the bridgehead carbon of the DA adduct, alpha to the bridgehead carbon on the $sp^2$ carbon of the DA adduct, or attached to a carbon or nitrogen of the $R^4$ portion. This DA adduct can be the only diol, or optionally, can be used with other diols of the structure:

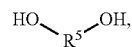

where $R^5$ is a linear, branched, or cyclic $C_1$-$C_{20}$ alkylene group, optionally interrupted by one or more oxygen, carbonyl, ester, and/or $[Si(CH_3)_2O]_zSi(CH_3)_2$ groups, where z is 1 to 20. The diisocyanate monomer can be:

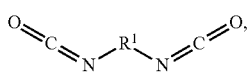

where $R^1$ is a linear, branched, or cyclic $C_1$-$C_{20}$ alkylene group, optionally interrupted by one or more oxygen, carbonyl, ester, and/or $[Si(CH_3)_2O]_zSi(CH_3)_2$ groups.

Figure 3:
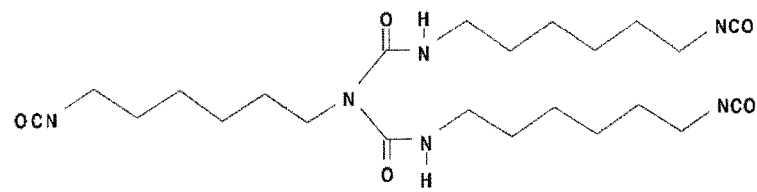
FIG. 3 shows the structures of tri and polyisocyanates that can be used as cross-linking sites in SMSHPs, according to an embodiment of the invention.
Figure 3:
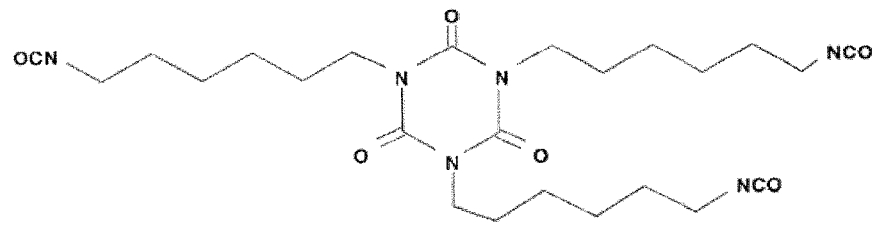
Figure 3:
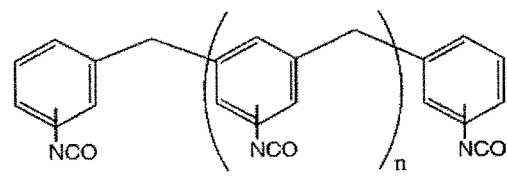
Figure 3:
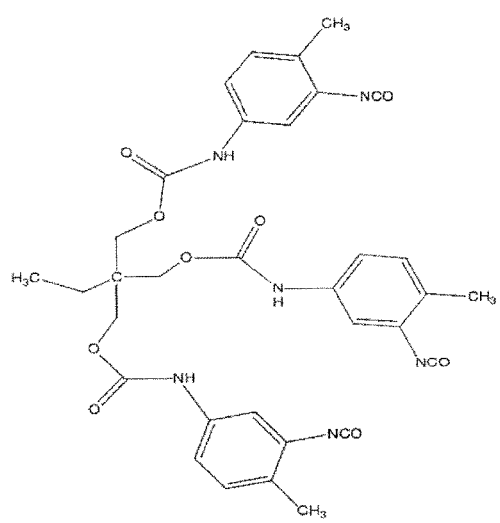
Figure 3:
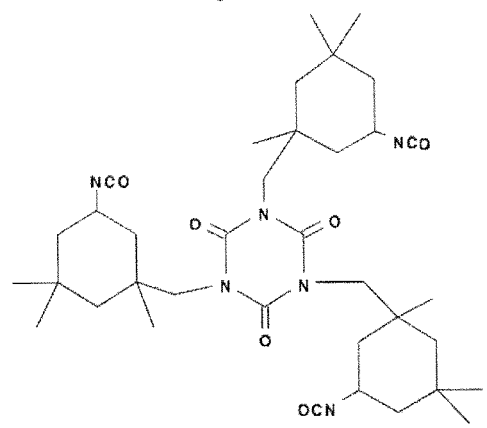

The cross-linking site can be supplied by a triol or other polyfunctional alcohol. The hydroxy groups can be attached to different carbons of an alkane, for example, glycerin, pentaerythritol, triethanol amine (TEA), N,N,N',N'-tetrakis(hydroxypropyl)ethylenediamine (HPED), oligo(vinyl alcohol), or any other compound with a multiplicity of hydroxy groups that does not include a functionality that would act as a diene or a dieneophile or a complementary monomer for addition to an isocyanate. Alternatively, the cross-linking site can be supplied by a triisocyanate or other multisocyanate compound, for example, those shown in FIG. 3, according to an embodiment of the invention.

Figure 4:
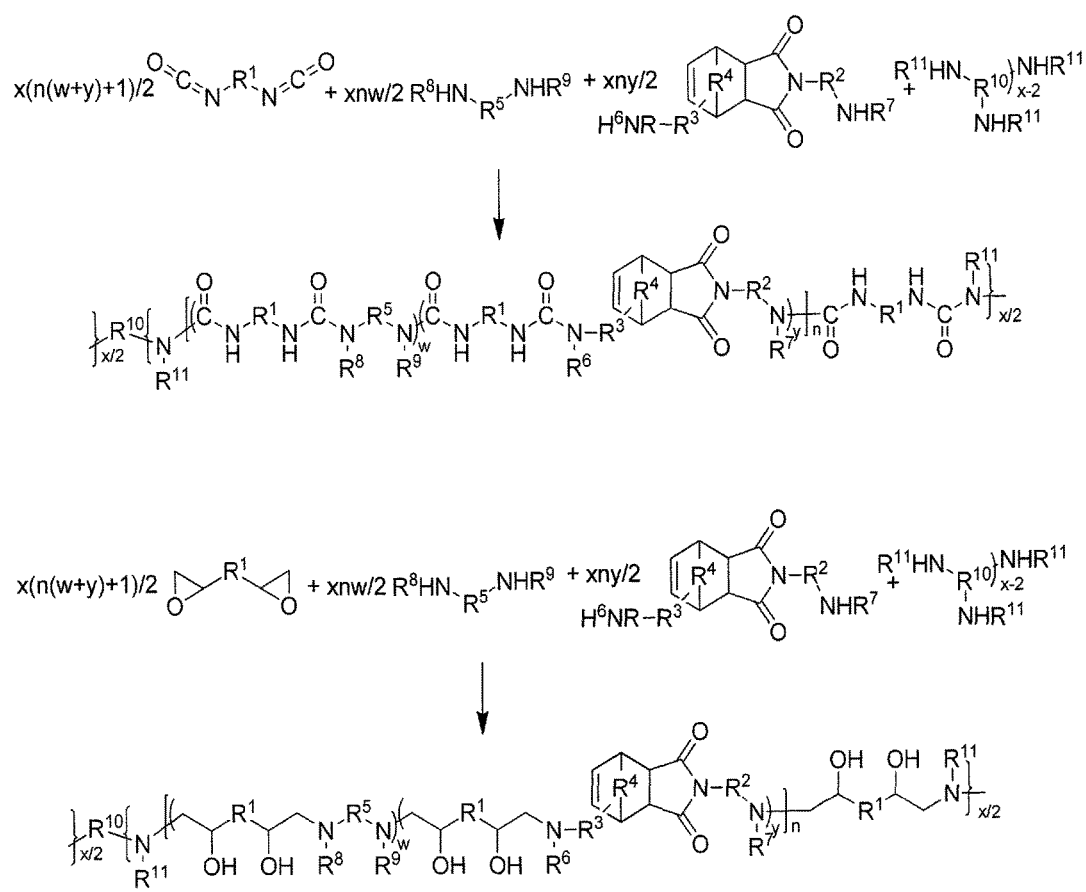
FIG. 4 shows reaction schemes for the preparation of SMSHPs where a) a polyurea network is prepared from a diisocyanate, a Diels-Alder (DA) adduct diamine, a second diamine, and an x-functional polyamine crosslinking site and b) a poly amine epoxy resin network is prepared from a diepoxy, a Diels-Alder (DA) adduct diamine, a second diamine, and an x-functional polyamine crosslinking site, according to embodiments of the invention.

In other embodiments of the invention, the SMSHP is an amine epoxy resin, where a β-amino alcohol is formed, or a polyurea that includes at least one diamine DA adduct of a cyclic diene and the dieneophile maleimide, at least one diepoxy or diisocyanate, optionally, one or more additional diamines and cross-linking a multi-functional amine monomer or multi-functional epoxy monomer or multi-functional isocyanate monomer. The preparation of SMSHPs are shown in FIG. 4. In this exemplary embodiment of the invention. The DA adduct,

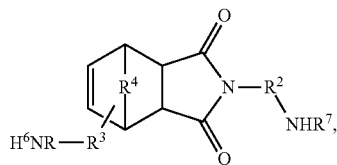

is the DA reaction product of the diene,

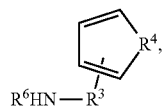

and the dieneophile,

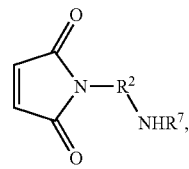

where: $R^2$ and $R^3$ are linear, branched, or cyclic $C_1$-$C_{20}$ alkylene groups, optionally interrupted by one or more oxygen, carbonyl, ester, and/or $[Si(CH_3)_2O]_zSi(CH_3)_2$ groups where z is 1 to 20; and $R^4$ is O, $CH_2$, $C_2H_4$, NH, $CH_2NH$, where any of the hydrogens may be substituted by a $C_1$-$C_{20}$ alkyl group, optionally interrupted by one or more oxygen, carbonyl, ester, and/or $[Si(CH_3)_2O]_zSi(CH_3)_2$ groups where z is 1 to 20, wherein any one of the hydrogens of the diene unit, including any hydrogen of the $R^4$ portion, may be substituted with the $R^3NHR^6$ group, such that the $R^3NHR^6$ group can be on the bridgehead carbon of the DA adduct, alpha to the bridgehead carbon on the $sp^2$ carbon of the DA adduct, or attached to a carbon or nitrogen of the $R^4$ portion. For example, in an embodiment of the invention, the DA adduct is the adduct between a substituted furan and an N-substituted maleimide wherein the furan is substituted in the 2-position resulting in a DA adduct that is substituted on an $sp^2$ carbon and not substituted on a bridgehead carbon. This DA adduct can be the only diamine, or optionally, can be used with other diamines of the structure:

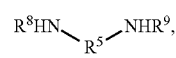

where $R^5$ is a linear, branched, or cyclic $C_1$-$C_{20}$ alkylene group, optionally interrupted by one or more oxygen, carbonyl, ester, and/or $[Si(CH_3)_2O]_zSi(CH_3)_2$ groups. The diepoxy monomer or diisocyanate monomer can be:

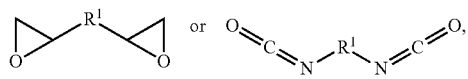

where $R^1$ is a linear, branched, or cyclic $C_1$-$C_{20}$ alkylene group, optionally interrupted by one or more oxygen, carbonyl, ester, and/or $[Si(CH_3)_2O]_zSi(CH_3)_2$ groups.

The cross-linking site can be supplied by a triamine or other polyfunctional amines. The amine groups can be attached to different carbons of an alkane, for example, spermidine, spermine, 2-(aminomethyl)-2-methyl-1,3-propanediamine, N-(2-aminoethyl)-1,3-propanediamine, bis(3-aminopropyl)amine, triethylenetetramine, N,N'-bis(2-aminoethyl)-1,3-propanediamine, 1,2-bis(3-aminopropylamino)ethane, N,N'-bis(3-aminopropyl)-1,3-propanediamine, tris[2-(methylamino)ethyl]amine, olio(ethyleneimine) in a linear, branched or dendritic form, or any other compound with a multiplicity of amino groups that does not include a functionality that would act as a diene or a dieneophile or a complementary monomer for addition to an epoxy or isocyanate group. Alternatively, the cross-linking site can be supplied by a triepoxide or triisocyanate or other multi-epoxide or mult-isocyanate compound, according to an embodiment of the invention.

In other embodiments of the invention, the DA adduct is not limited only to fully carbon π-systems in the diene or where the dieneophile is maleimide. One or more atoms of the diene π-system and/or dieneophile of the DA adduct may be a non-carbon atom, for example, N=N or C=N, S=O, N=O, C=O, and P=Se, that are used in hetero-Diels-Alder reactions. In embodiments of the invention, the diene derived portion of the DA adduct is contained within a cyclic ring to bias the diene into the s-cis conformation, for example, a furan ring, a pyrrole ring, a cyclopentadiene ring, a 1,3-cyclohexene ring, or other conjugated diene containing ring. The diene can be substituted at any one of the carbons of the diene, or on any one of the carbon or nitrogen atoms of the ring that is not part of the diene, for example, on the 5-position $sp^3$ carbon of a cyclopentadiene ring. The diene may be substituted once to a functional group for step-growth polymerization, for example, by a hydroxy group or an isocyanato group when the step-growth polymerization monomers are for the preparation of polyurethanes. In another embodiment of the invention, the diene portion of the DA adduct can be a terminal diene of a $C_5$ or larger hydrocarbon that includes a functional group for a step-growth polymerization. In embodiments of the invention, the dieneophile can be any $CH_2=CH_2$, $CH_2=NH$, or $NH=NH$ that is inserted between a hydrogen, $H-C=O$, $R'O-C=O$, $R'HN-C=O$, or $R'_2N-CO$ and a $HO-R-O-C=O$, $HO-R-HN-C=O$, or $HO-R-N(R')-CO$, where R is a linear, branched, or cyclic $C_1$-$C_{20}$ alkylene group, optionally interrupted by one or more oxygen, carbonyl, ester, and/or $[Si(CH_3)_2O]_zSi(CH_3)_2$ groups and R' is a linear, branched, or cyclic $C_1$-$C_{20}$ alkyl group, optionally interrupted by one or more oxygen, carbonyl, ester, and/or $[Si(CH_3)_2O]_zSi(CH_3)_2$ groups.

Methods and Materials

Figure 5:
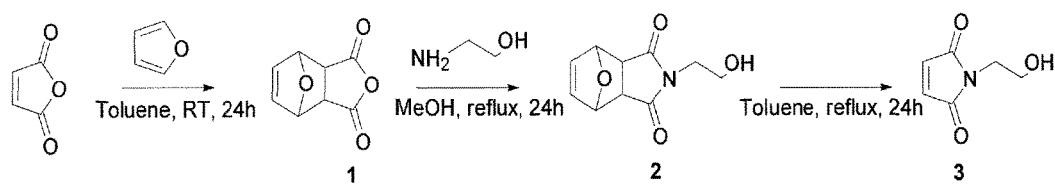
FIG. 5 shows a reaction scheme for the preparation of 3, according to an embodiment of the invention.
Figure 6:
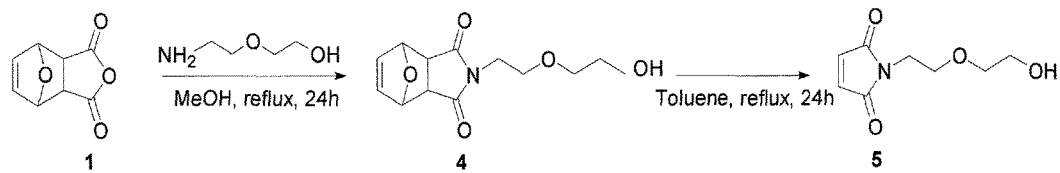
FIG. 6 shows a reaction scheme for the preparation of 5, according to an embodiment of the invention.

Furfuryl alcohol (FA), hexamethylene diisocyanate (HDI), triethanolamine (TEA), and N,N,N',N'-tetrakis(hydroxypropyl)ethylenediamine (HPED) were used as received from commercial sources. N-(2-hydroxyethyl)-maleimide (HEM), 3, and N-[2-(2-hydroxyethoxy)ethyl]-maleimide (HEEM), 5, are prepared employing sequentially a DA and RDA via a three steps process, as shown in FIG. 5 and FIG. 6, respectively, and as detailed below. Unidirectional carbon fabric (US Composites, FG-CFU001) was employed as received for the reinforcing fibers of the composites.

N-(2-Hydroxyethyl)maleimide (HEM) (3)

Step 1—Preparation of 4,10-Dioxatricyclo[5.2.1.02,6]dec-8-ene-3,5-dione (1)

As shown in FIG. 4, maleic anhydride (30 g, 305.94 mmol) and furan (21 g, 308.51 mmol) were mixed with toluene (300 ml) at room temperature for 24 hours. Furan is added in a slight excess to the maleic anhydride. After 24 hours, a fine white solid powder precipitated and the mixture was filtered and dried to obtain 1 in 85.6% yield. $T_m$=123° C.; $^1$H NMR (300 Hz, DMSO-d6) δ 6.59 (s, 2H), 5.36 (s, 2H), 3.32 (s, 2H) ppm; $^{13}$C NMR (300 Hz, DMSO-d6) δ 171.98, 137.30, 82.11, 49.53 ppm Step 2—Preparation of 4-(2-Hydroxyethyl)-10-oxa-4-aza-tricyclo[5.2.1.02,6]dec-8-ene-3,5-dione (2)

A solution of 1 (30 g, 180.58 mmol) in methanol (60 ml) was cooled in an ice bath for 15 minutes. Ethanolamine (11.04 g, 180.75 mmol) in methanol (5 ml) was slowly added over a 30 minutes period to the stirred solution of 1 at ice bath temperatures. Upon addition, the reaction mixture was maintained at ice bath temperatures for 30 minutes and at room temperature for an additional 30 minutes. The solution was refluxed for 24 hours. Upon cooling a pale yellow powder formed. This powder was filtered and dried resulting in a 46.6% yield. $T_m$=142° C.; $^1$H NMR (300 Hz, DMSO-d6) δ 6.53 (s, 2H), 5.10 (s, 2H), 4.74 (br, 1H), 3.40 (br, 4H), 2.90 (s, 2H) ppm; $^{13}$C NMR (300 Hz, DMSO-d6) δ 176.93, 136.89, 80.73, 57.73, 47.57, 41.06 ppm Step 3—Preparation of N-(2-Hydroxyethyl)-maleimide (3)

A solution of 2 (30 g) in toluene (180 ml) was refluxed in excess of 24 hours until the RDA reaction was determined to be complete by $^1$H NMR analysis as indicated by loss of the peaks at 6.520 ppm and 5.104 ppm. The solution was cooled and a pale yellow powder precipitated that was collected by filtration in an 83.02% yield of 3. $T_m$=75° C.; $^1$H NMR (300 Hz, DMSO-d6) δ 6.97 (s, 2H), 4.80 (br, 1H), 3.44 (br, 4H) ppm; $^{13}$C NMR (300 Hz, DMSO-d6) δ 171.53, 134.88, 58.37, 40.38 ppm N-[2-(2-hydroxyethoxy)ethyl]-maleimide (HEEM) (4)

Step 1—Preparation of N-[2-(2-Hydroxyethoxy)ethyl]-exo-3,6-epoxy-1,2,3,6-tetrahydro-phthalimide (4)

As shown in FIG. 6, a solution of 1 (55.38 g, 333 mmol) in methanol (100 ml) was cooled in an ice bath for 30 minutes and 2-(2-Aminoethoxy)-ethanol (35.05 g, 333 mmol) in methanol (20 ml) was added dropwise to the stirred solution of 1. The resulting mixture was stirred in the ice bath for 30 minutes and at room temperature for 30 minutes, followed by reflux for 24 hours. Methanol was removed at reduced pressure. The resulting solid was dissolved in dichloromethane (100 ml) and extracted sequentially with three 200 ml portions of water. After evaporation of the dichloromethane, 4 was obtained. $^1$H NMR (300 Hz, CDCl$_3$) δ 6.52 (s, 2H), 5.28 (br, 2H), 3.84-3.53 (m, 4H) 2.89 (s, 2H) ppm; $^{13}$C NMR (300 Hz, CDCl$_3$) δ 176.44, 136.41, 80.93, 72.21, 67.00, 61.43, 47.35, 38.45 ppm Step 2—Preparation of N-[2-(2-hydroxyethoxy)ethyl]-maleimide (5)

A solution of 4 (60 g) in toluene (300 ml) was refluxed for 48 hours when $^1$H NMR analysis indicated that the RDA was complete. $^1$H NMR (300 Hz, CDCl$_3$) δ 6.73 (s, 2H), 3.94 (br, 1H), 3.73-3.70 (d, 2H), 3.67-3.63 (m, 4H), 3.57-3.54 (d, 2H) ppm; $^{13}$C NMR (300 Hz, CDCl$_3$) δ 170.78, 134.12, 71.98, 67.84, 61.31, 37.16.

DA Adduct Monomers

Figure 7:
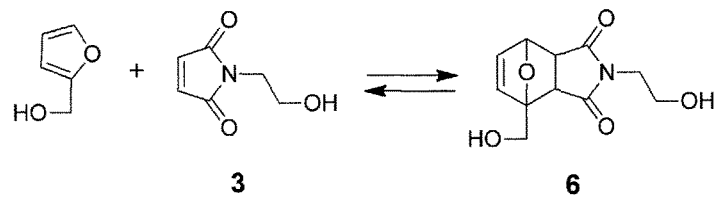
FIG. 7 shows a reaction scheme for the preparation of DA adduct 6 from 3, according to an embodiment of the invention.

As shown in FIG. 7, furfuryl alcohol (FA) and 3 were dissolved in toluene at a 1:1 molar ratio and the solution was heated to 75° C. with stirring for 12 hours to yield a pale yellow precipitate of the DA adduct 6. The precipitate was vacuum filtered and washed twice with ether. $T_m$=110° C. $^1$H NMR (300 Hz, DMSO-d$_6$) δ 6.52 (br, 2H), 5.07 (s, 1H), 4.92 (br, 1H), 4.75 (br, 1H), 4.01 (d, 1H), 3.71 (d, 1H), 3.41 (s, 4H), 3.03 (d, 1H), 2.89 (d, 1H) ppm; $^{13}$C NMR (300 Hz, DMSO-d$_6$) δ 176.85, 175.40, 138.53, 136.91, 92.07, 80.63, 59.40, 57.74, 50.39, 48.21, 41.00 ppm. In like manner, the DA adduct, 7, of FA and 5 was prepared.

Polymers

Figure 8:
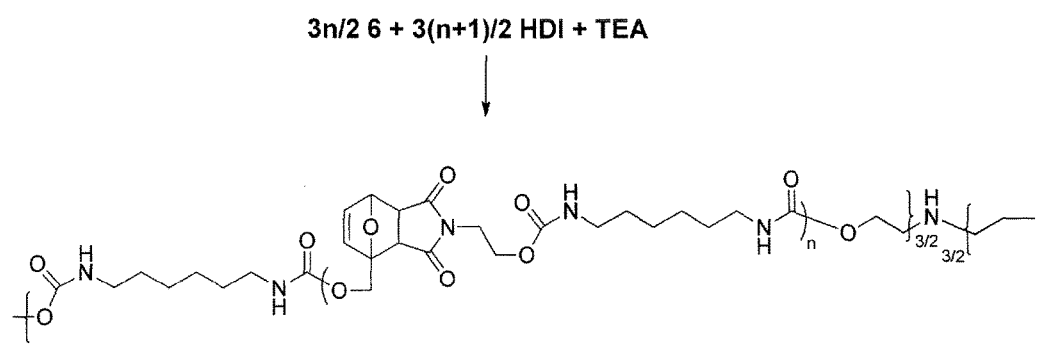
FIG. 8 shows a reaction scheme for the preparation of an exemplary SMSHP used for the demonstration of material properties, according to an embodiment of the invention.

In a glass bottle, 6 was heated to 110° C. and, as indicated in FIG. 8, the melt was combined with HDI, and TEA (as illustrated) or HPED and the mixture was stirred at 200 rpm until the mixture clarified. The stirring was stopped and the clear mixture was poured into a mold. The mold was degassed for 5 minutes to obtain a void free molded SMSHP. The filled mold was transferred into an oven at 100° C. where it was retained at 100° C. for 2 hours and heated to 120° C. and maintained for 2 hours. The oven was cooled to 95° C. and the temperature maintained for 2 hours, cooled to 75° C. and kept at this temperature for another 2 hours. The oven was turned off and all samples were slowly cooled to room temperature in the oven.

DA-RDA Studies

Figure 9:
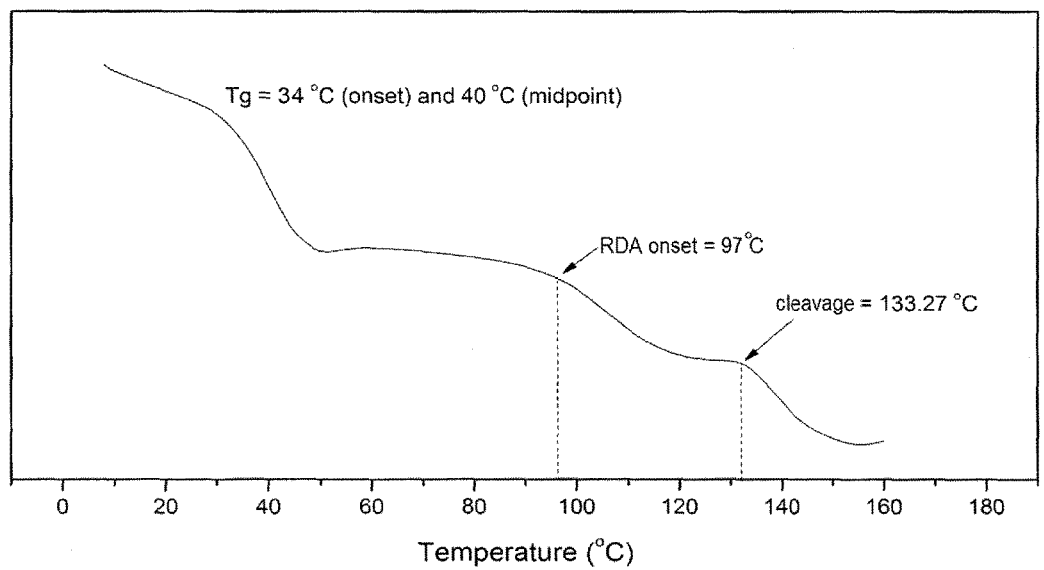
FIG. 9 shows a differential scanning calorimetry trace for the self-healing polymer (SHP) prepared from 6 and hexamethylene diisocyanate (HDI) that indicates the temperature for the DA and RDA reactions of the exemplary SMSHPs, according to an embodiment of the invention.

The DA-RDA equilibrium for DA adduct 6 is indicated in FIG. 7. Using SMSHPs, differential scanning calorimetry (DSC), was carried out. At temperatures in excess of 133° C. the diene and dieneophile are essentially the only entities present as indicated by DSC, as shown in FIG. 9. From the DSC data, the glass transition temperature, 34° C., is indicated by the onset of the thermal transition, of the polymer, the temperature for the beginning of the RDA reaction, 97° C., and the temperature where the RDA product diene and dieneophile are the only species, 133° C. is indicated in FIG. 9 for the homopolymer of 6 and polymer.

Compact Tension (CT) Testing

Figure 10:
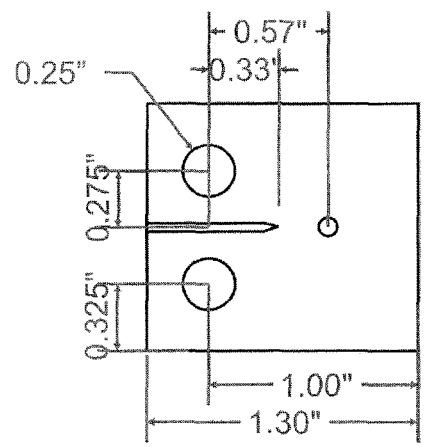
FIG. 10 shows the features of a compact tension (CT) test sample for probing the self-healing properties of SMSHPs, according to an embodiment of the invention.

CT tests were carried out using an Instron 5969 to measure the maximum loads for original and healed samples. CT test specimens had a pin-pin configuration that were constructed using a computer numerical control (CNC) with dimensions modified from the ASME D 5045 dimension as shown in FIG. 10. A resting hole on the promoted crack path stops the propagation of the crack in the middle of the sample. The SMSHP for CT testing was prepared from 6, HDI, and HPED in a 2:4:1 molar ratio, below 97° C., such that the equilibrium has almost exclusively DA adduct.

Healing Studies

After the virgin SMSHP was fractured in a CT test, the sample was placed into a vacuum oven under nitrogen without any external forces placed on the sample to keep the cracked surfaces in contact. The fractured specimen was warmed to 135° C. for two hours, 95° C. for two hours, and 75° C. for two hours while maintaining a nitrogen atmosphere. The CT test was repeated on the healed sample. To determine the healing efficiency, Equation 1, below, the initial and post-healing maximum loads were determined.

$$\text{Healing Efficiency (\%)} = 100 \times \text{Max. Load}_{healed} / \text{Max. Load}_{virgin} \quad \text{Equation 1}$$

Figure 11:
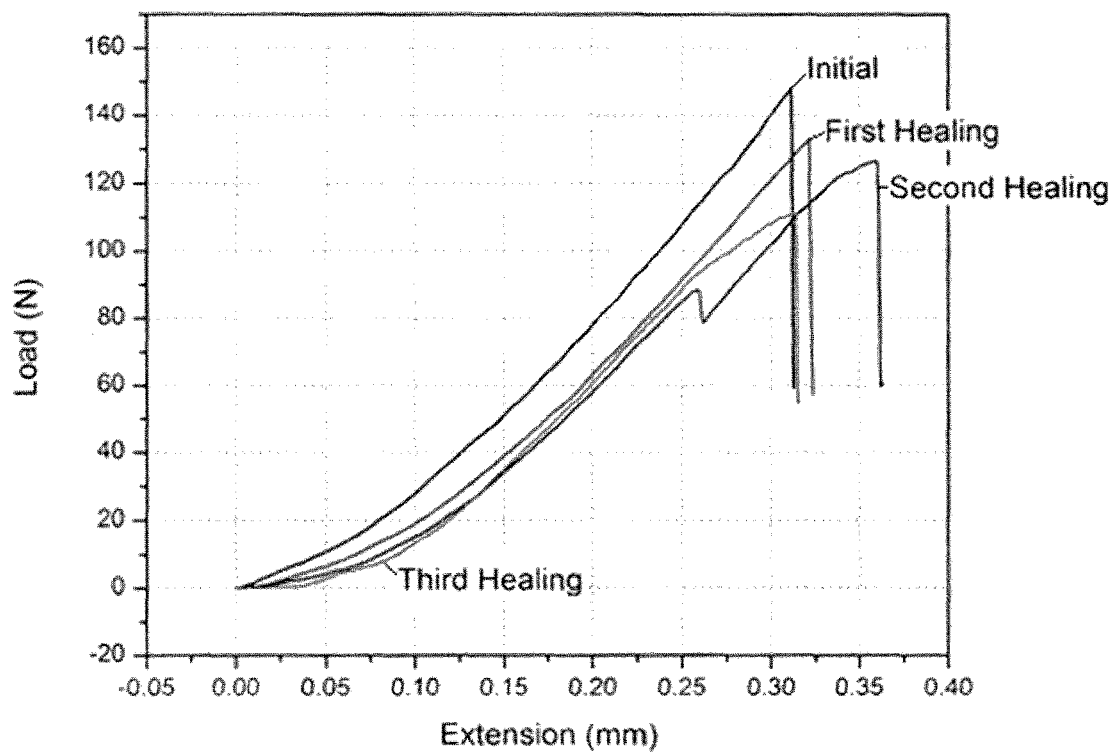
FIG. 11 shows plots of load vs. extension to failure of: a virgin (initial) SMSHP; a once healed SMSHP, a twice healed SMSHP, and a thrice healed SMSHP, according to an embodiment of the invention.

Table 1, below, shows maximum loads for fracture of CT test results for polymer samples prepared with a molar ratio of DA:HPED:HDI equal to 2:1:4. Plots of extension vs. load to failure for the CT tests are given in FIG. 11. The healing efficiencies were calculated for from the first, second, and third CT tests on the healed samples, as 90%, 85%, and 75%, respectively.

TABLE 1

Maximum CT Test Loads and Healing Efficiencies for Subsequent Healings

|  | Initial | First Healing | Second Healing | Third Healing |
| --- | --- | --- | --- | --- |
| Max. Load (N) | 148.27 | 132.75 | 126.61 | 111.30 |
| Healing Efficiency | — | 89.53% | 85.39% | 75.06% |

Polymer Composites

Figure 12:
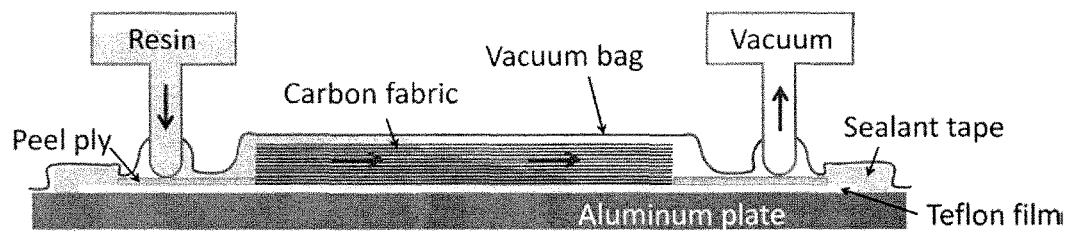
FIG. 12 shows a schematic drawing of a vacuum assisted resin transfer molding system employed for formation of self-healing composites, according to an embodiment of the invention.

Two different polyurethane resins (1.5DA1T and 2DA1H) were prepared using DA, TEA or HPED, and HDI. For resin 1.5DA1T, 1.5 mol of DA, 1 mol of TEA, and 3 mol of HDI were used. Similarly, 2 mol of DA, 1 mol of HPED, and 4 mol of HDI were used for resin formulation 2DA1H. The polyurethane formulations were infused into the fiber preform using vacuum assisted resin transfer molding (VARTM), as shown in FIG. 12, to form composites designated C1.5DA1T and C2DA1H. As verified through nitric acid digestion according to ASTM D 3171 procedure A, the VARTM method yields high volume fraction composites (70% fiber and 30% resin for C1.5DA1T and 73% fiber and 27% resin for C2DA1H by volume). When fabricating samples, 12 plies of unidirectional carbon fiber fabric with dimensions of 25.4 mm×76.2 mm were used and the thicknesses of the fabricated composite samples were between 3.3 mm and 3.4 mm.

DA and either TEA or HPED were heated and mixed at 105° C. until the DA monomer was melted completely. While stirring the molten DA, HDI was added at 105° C. Then, the mixed molten resin at 105° C. was added through an entry tube while vacuum was applied to an outlet tube. To increase resin mobility during transfer to the low pressure outlet tube, a TEFLON® film was situated to reduce friction between the resin and base plate with the VARTM being placed on a 60° C. hot plate. After complete transfer of the molten resin, an aluminum plate was placed on top of the VARTM setup. The setup was heated at 125° C. for two hours, followed by heating at 90° C. for two hours, and followed with final heating at 70° C. for two more hours with pressing of the specimen with a pressure of approximately 100 psi between the aluminum plates. The temperature profile was maintained below the RDA cleaving temperature of approximately 130° C. to ensure all DA bonds in the matrix were connected upon fabrication of the composite. In order to assure that the resin completely polymerized, the composite was removed from the aluminum plate and heated a second time with the same temperature and time profiles in an oven.

Carbon fiber reinforced composites with epoxy (Epon 862 and curing agent 3230) were fabricated with the same VARTM setup in order to compare short beam strength testing results of C1.5DA1T and C2DA1H with commercially available resin. The previous VARTM procedures were followed and a standard curing temperature profile for Epon 862 with curing agent 3230 was applied. The epoxy specimens were kept at room temperature for 20 h, heated to 80° C. for two hours, and heated to 125° C. for three hours under a pressure of approximately 100 psi.

Characterization

To confirm the glass transition, the DA reaction, and the retro-DA reaction temperatures, differential scanning calorimetry (DSC), (TA Q20), was employed. To enhance the DA signal in the DSC, composites were preheated to a temperature of 140° C. for 30 min and rapidly quenched. Specimens of approximately 10 mg in weight were placed into a Tzero aluminum pan and tested under a nitrogen purge at a flow rate of 50 mL/min. The DSC testing was performed over a temperature range of −20° C. to 160° C. with a heating rate of 10° C./min. TA Universal Analysis software was used for data analysis. Reversibility by the DA and RDA reactions was characterized through variable temperature carbon nuclear magnetic resonance (VT $^{13}$C NMR) using a 500 MHz NMR instrument (Inova 2). DA monomers HEM and FA in deuterated dimethyl sulfoxide were used for the NMR study. The samples were heated to 140° C. for 30 minutes to promote the RDA reaction and subsequently cooled to 80° C. and maintained for 90 min to permit the DA reaction. Identical temperature and time profiles were repeated to confirm the reversibility of the DA and RDA reactions. An internal heater of the NMR instrument was used for heating the specimen and an external liquid nitrogen cooling system was employed for cooling.

In order to determine the healing efficiency of the self-healing polymers, fracture load compact tension (CT) testing was performed on an Instron 5969 at room temperature. CT testing was completed according to the ASTM D 5045 standard with an added resting hole in the middle of the fracture path to terminate crack propagation. The length of the notch was reduced to increase the shape recovery force of the specimen when healing. Constant opening rates of 1 mm/min for cured 1.5DA1T and 0.5 mm/min for cured 2DA1H were used for all CT testing to measure the loads of initial and post-healed specimens. The opening rates were changed to avoid crazing and deforming upon the crack initiated, and to assure that the crack stopped at the resting hole. Eight specimens for each polyurethane were tested and the acquired data were used to determine healing efficiencies.

To determine mechanical properties of each polymer, tensile testings according to ASTM 638 Type V standards were conducted on 12 flat specimens of cured 1.5DA1T and 12 specimens of cured 2DA1H. Mechanical properties include tensile strength, strain, and Young's modulus. All tests were conducted at room temperature with an opening rate of 5 mm/min. The average fracture toughness of cured 1.5DA1T and cured 2DA1H were calculated using the maximum loads from CT testing on six specimens of each polymer.

Self-Healing Tests

The healing efficiency of the composite samples were calculated using short beam strength data obtained through short beam shear testing. Testing was performed on an Instron 5969. The specimen dimensions and testing procedures satisfied by the ASTM D2344 standards with specimens with a thickness of 3.3 mm, a width of 6.6 mm and a length of 19.8 mm. A total of 13 specimens were fractured at room temperature at a rate of 1 mm/min. The process was repeated on each specimen to obtain first and second healing cycle efficiencies.

Figure 13:
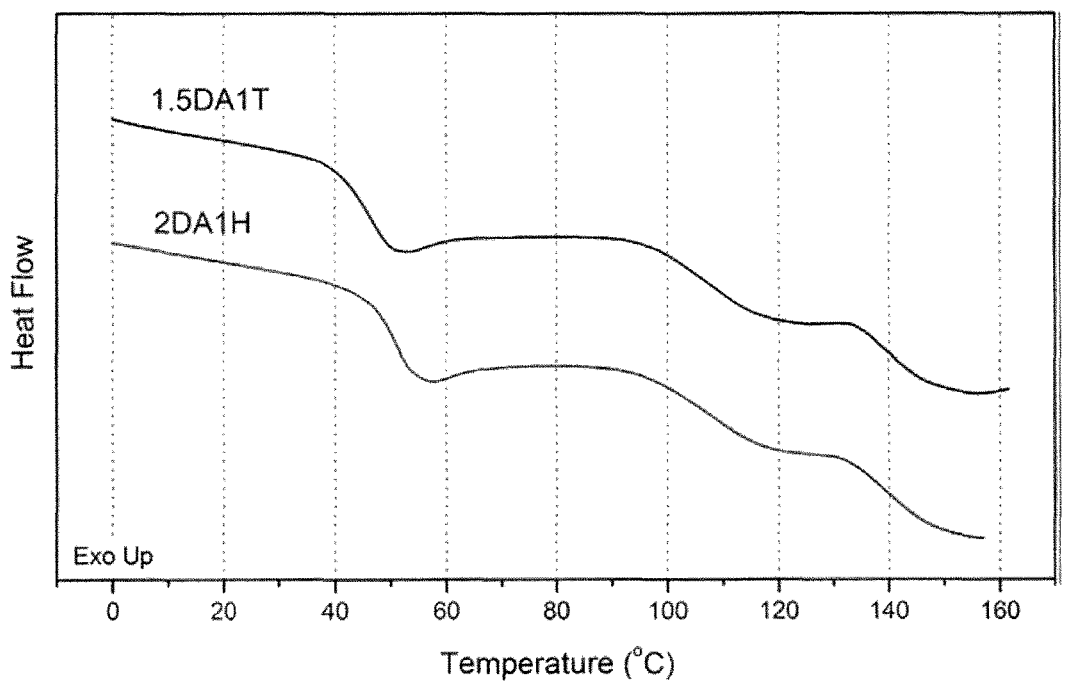
FIG. 13 shows representative differential scanning calorimetry data of a 1.5DA1T network and a 2DA1H network, according to an embodiment of the invention.

The DA and r-DA temperatures of the polymers observed by using a DSC from 1.5DA1T resin and 2DA1H resin are shown in FIG. 13. The transition temperatures of 46.8° C. and 51.1° C. indicate the glass transition (midpoint) of polymers from 1.5DA1T and 2DA1H respectively. The temperature of the DA reaction (96.6° C. for 1.5DA1T and 95.5° C. for 2DA1H) and the RDA reaction (134.2° C. for 1.5DA1T and 132.6° C. for 2DA1H) are the second and third transitions that are observed. The DSC data, average transition temperatures, and the standard deviation, from six specimens of 1.5DA1T and six specimen of 2DA1H are reported in Table 2, below.

TABLE 2

Average glass transition temperature (midpoint), DA temperature, and RDA temperature of six 1.5DA1T and six 2DA1H polymer networks

|  | 1.5DA1T | Standard deviation | 2DA1H | Standard deviation |
| --- | --- | --- | --- | --- |
| Glass transition temperature (° C.) | 45.6 | 3.8 | 49.7 | 5.7 |
| DA temperature (° C.) | 96.6 | 1.5 | 96.3 | 2.3 |
| RDA temperature (° C.) | 129.3 | 2.5 | 129.6 | 3.2 |

Figure 14:
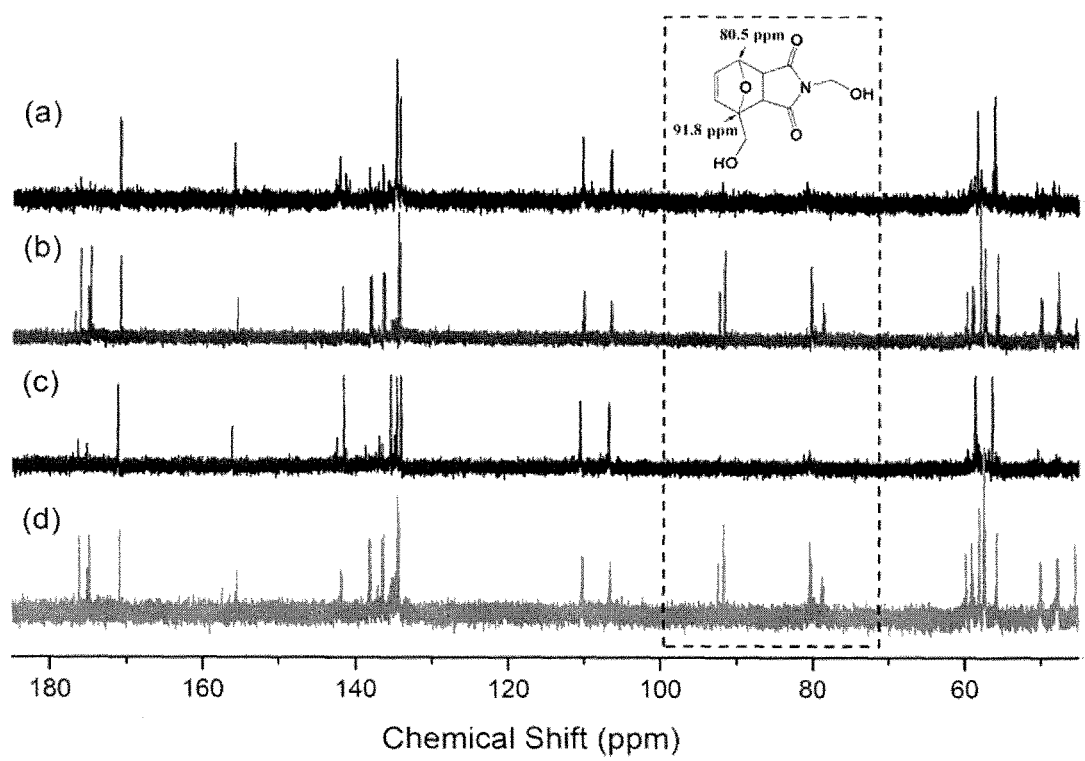
FIG. 14 shows composite Carbon VT NMR spectra of the DA monomer at two different temperatures where the monomer is held at (a) 140° C. for 30 minutes to promote the RDA reaction, (b) cooled and held at 80° C. for 90 minutes to promote the DA reaction, (c) heating to 140° C. and holding for 30 minutes for promotion of a second rDA reaction, and (d) cooling to 80° C. and holding for 90 min to promote a second DA reaction.

Variable temperature carbon nuclear magnetic resonance (VT NMR) spectra for DA monomer 6 are shown in FIG. 14. As shown in FIG. 14, two peaks at 91.8 ppm and 80.5 ppm are absent, scans a and c, indicating RDA cleavage at 140° C., but these peaks reappear, scans b and d, when the DA reaction occurs at 80° C. The two peaks of 91.8 ppm and 80.5 ppm are for the bridgehead carbons of the DA adduct. CT testing indicates the healing performances of the polymer networks. The maximum loads at fracture of the as cast and healed specimens were measured and healing efficiencies were calculated using the initial and post healing peak loads from the CT tests. For the first and second healing processes, average efficiencies of 84.1% and 84.3% for 1.5DA1T, and 96.1% and 82.1% for 2DA1H, respectively, were calculated, as indicated in Table 3, below. The higher healing efficiencies associated with 2DA1H could be attributed to a greater quantity of DA units available to heal the crack surfaces.

TABLE 3

Average healing efficiencies of 1.5DA1T and 2DA1H polymer networks

| Polyurethane | First healing efficiency[a] | Standard deviation | Second healing efficiency[a] | Standard deviation |
| --- | --- | --- | --- | --- |
| 1.5DA1T | 84.1% | 14.5 | 84.3% | 7.8 |
| 2DA1H | 96.1% | 22.5 | 82.1% | 21.0 |

[a]Healing efficiency is equal to post-healing maximum load divided by initial maximum load multiplied by 100.

The mechanical properties of self-healing polyurethanes were investigated using 12 specimens for each polymer network resulting in an average ultimate tensile strength, strain, and Young's modulus of 87.8 MPa, 5.4%, and 2.57 GPa, respectively, from 1.5DA1T, and 53.7 MPa, 2.3%, and 2.56 GPa, respectively, from 2DA1H. The 1.5DA1T network has a larger tensile strain than 2DA1H due to a greater amount of elastic shape memory polyurethane with TEA, HPED, and HDI.

For fracture toughness, a total of six specimens of each polymer network were tested and the average measurements of 1.06 MPa for 1.5DA1T network and 1.06 MPa for 2DA1H network were obtained. Both average fracture toughness values are greater than that of comparable commercial epoxy networks. All mechanical property data are listed, along with their standard deviations in Table 4. These data were compared to composite grade epoxy since the developed polyurethanes were used as substitutes for epoxys for the polymer matrix.

TABLE 4

Mechanical properties of 1.5DA1T and 2DA1H networks compared to standard epoxy networks.

| Mechanical property | 1.5DA1T | Standard deviation | 2DA1H | Standard deviation | Epoxy |
| --- | --- | --- | --- | --- | --- |
| Ultimate tensile strength (MPa) | 87.8 | 7.6 | 53.7 | 18.8 | 35-130 |
| Ultimate tensile strain (%) | 5.4 | 2.8 | 2.3 | 0.9 | 2-5 |
| Young's modulus (GPa) | 2.57 | 0.2 | 2.56 | 0.3 | 2-6 |
| Fracture toughness (MPa$\sqrt{m}$) | 1.06 | 0.04 | 1.06 | 0.2 | 0.65[a] |

[a]Epoxy resin (L135i) with an amine hardener (H137i)

Composite healing after short beam shear testing was carried out on the composite specimens by placing the composite on a hot press and pressing with a pressure of approximately 100 psi, which was identical to that for composite fabrication. Specimens were heated to 135° C. for two hours, cooled and kept at 90° C. for two hours, and maintained at 70° C. for two hours. An additional 15 minutes were allowed for each temperature transition. The temperature profile allowed sufficient time for DA and RDA reactions based on the variable temperature (VT) proton NMR analysis above.

Figure 15A:
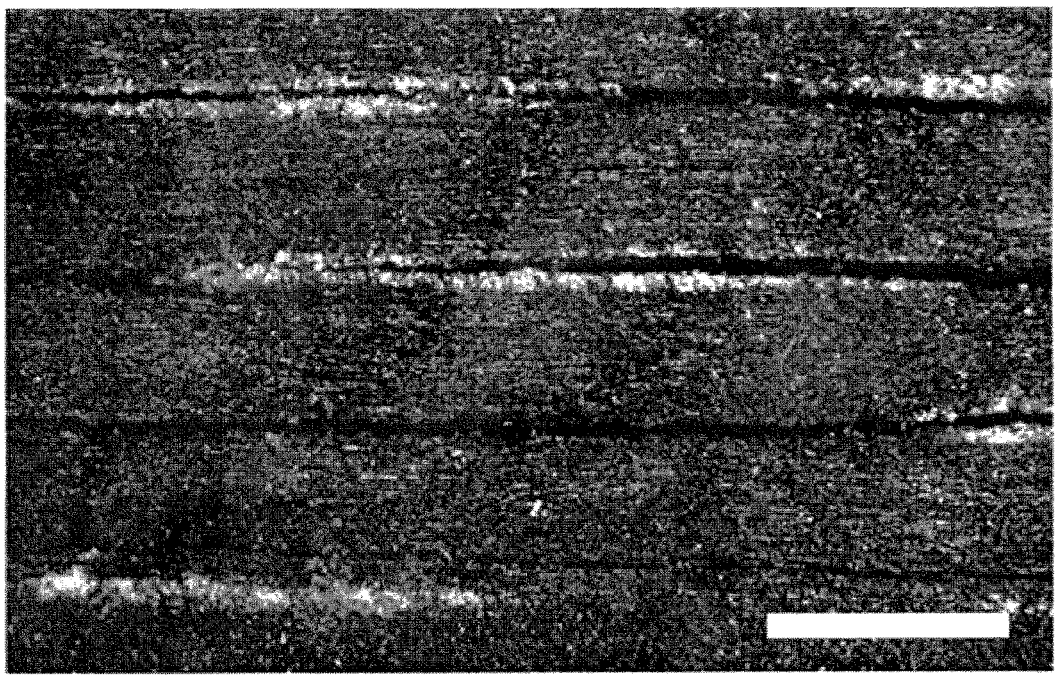
FIG. 15A shows an optical microscopy image of a fractured composite laminate before healing.
Figure 15B:
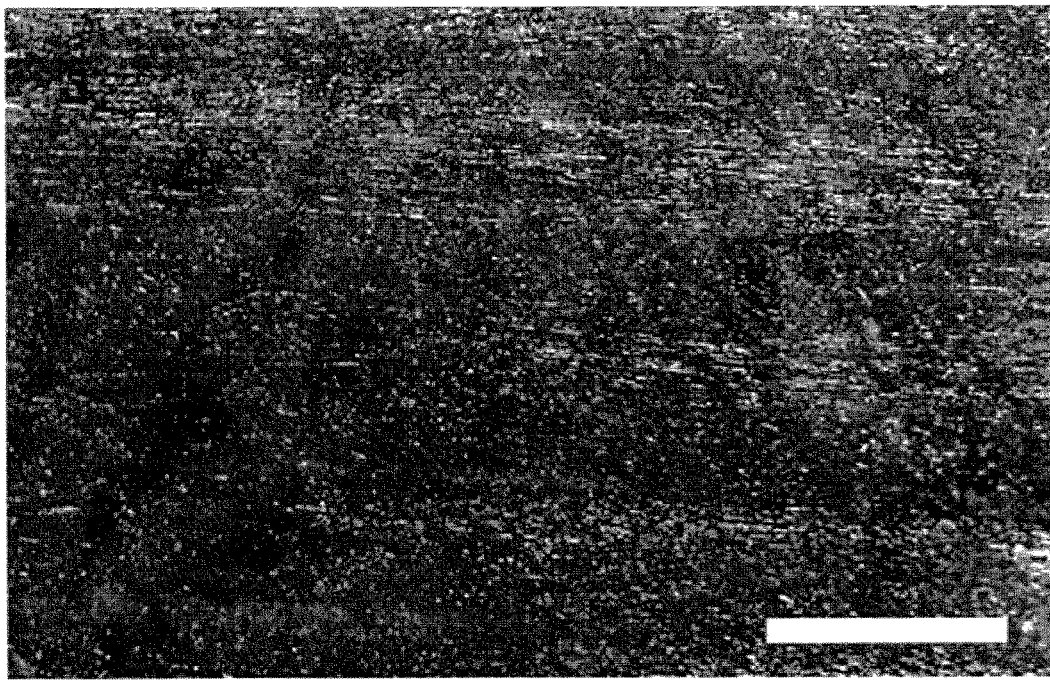
FIG. 15B shows an optical microscopy image after healing of the fractured composite laminate of FIG. 15A.
Figure 15C:
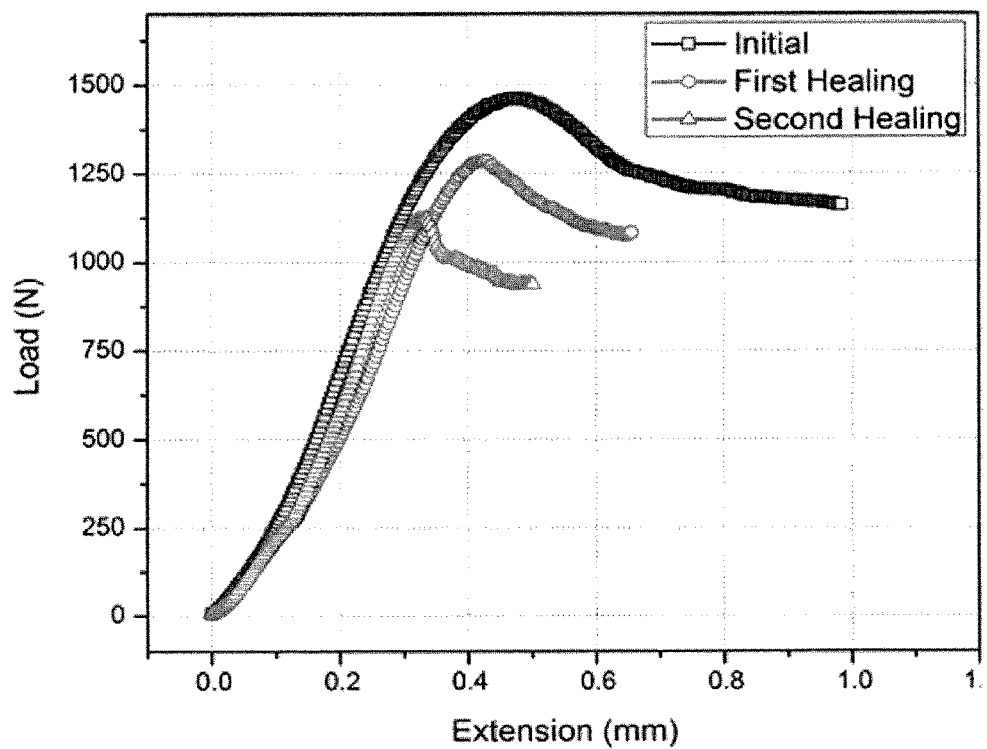
FIG. 15C shows a representative SBS testing results for C1.5DA1T, according to an embodiment of the invention.
Figure 15D:
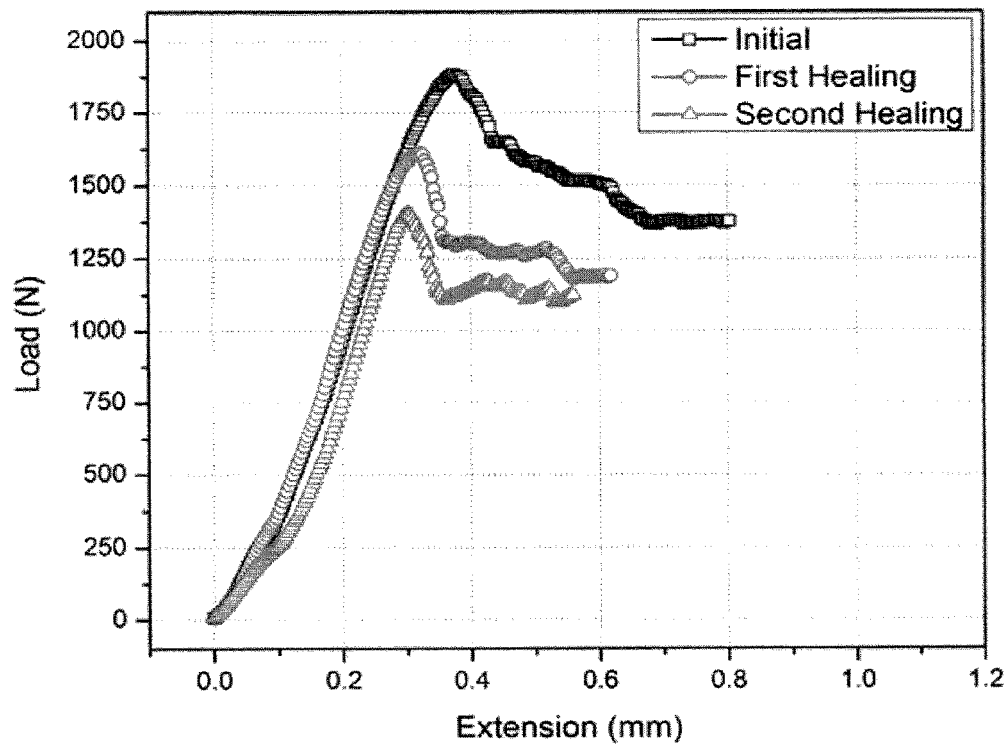
FIG. 15D shows a representative SBS testing results for C2DA1H, according to an embodiment of the invention.

Composite healing efficiencies were determined by conducting short beam shear (SBS) testing on a total of 13 specimens of each composite. The short beam strengths (SBS) of the unidirectional carbon fiber reinforced composites: C1.5DA1T; C2DA1H; and epoxy composites from Epon 862 and curing agent 3230 were determined from 13 specimens to be 44.7 MPa, 55.7 MPa, and 65.2 MPa, respectively. To calculate specimen healing efficiency, maximum load was measured and the SBS was calculated in accoRDAnce with the ASTM D 2344 method. The SBS leads to significant delamination throughout the composite, as shown in FIG. 15A, but delamination in the composite is effectively eliminated upon healing, as shown in FIG. 15B. SBS testing was repeated to measure the post-healing maximum load and representative SBS testing results for C1.5DA1T and C2DA1H are presented graphically in FIGS. 15C and 15D. These results indicate that first and second healing efficiencies of 88.1% and 76.7% for C1.5DA1T and 85.8% and 74.5% for C2DA1H, respectively, were achieved. The average composite efficiencies are given in Table 5, below. C1.5DA1T and C2DA1H achieved averaged efficiencies of 87.8% and 84.7% for the first healing and averaged efficiencies of 72.7% and 73.8% for the second healing, respectively.

TABLE 5

Average healing efficiencies of C1.5DA1T and C2DA1H.

| Composite | First healing efficiency[a] | Standard deviation | Second healing efficiency[a] | Standard deviation |
|---|---|---|---|---|
| C1.5DA1T | 87.8% | 11.3 | 72.7% | 9.4 |
| C2DA1H | 84.7% | 8.4 | 73.8% | 10.5 |

[a]Healing efficiency is equal to post-healing maximum load divided by initial maximum load multiplied by 100.

The average healing efficiencies of composites (Table 5) C1.5DA1T and C2DA1H were marginally lower than that determined for the polymer network alone (Table 3) 1.5DA1T, and 2DA1H, except for the first healing efficiency of C1.5DA1T. Reasons for the different healing efficiencies are potentially because delamination could occur in the polymer matrix region or at the fiber surface. Resulting cracks created within the polymer matrix can be healed using DA reactions, but in order to heal cracks at the fiber interfaces of the composites, the carbon fibers would have to have remained in their original positions when delaminating. Voids due to misplaced fibers might have formed between the crack surfaces during the healing process. Fracture of the reinforcing fiber cannot be healed and any damage to carbon fibers would lead to reduced strength upon reloading.

Unlike the polymers that were able to heal with only the shape memory effect, the self-healing composites were not able to recover their short beam properties without imposing external forces. Original specimens were heated in an oven without any applied force, which allows the plastic deformation in bent specimens after short beam testing to recover their shape through heating. However, the SBS testing showed that the slope was much smaller than the initial curve, implying that crack defects were not healed. This is consistent with insufficient shape memory recovery force to shift the delaminated fabric. With any fibers shifted into a different position when delaminating, even greater pressures would be needed to force the cracked surfaces back into contact. It may be possible to use the shape memory properties for healing without the application of an external force in larger specimens with a greater volume of undamaged polymer and fiber. Nevertheless, high strength carbon fiber reinforced polymer composites according to an embodiment of the invention, exhibit repeatable healing. Because these self-healing polymer composites were processed using typical commercial resin infusion processes, the DA unit comprising polymer resins can be used for the manufacture of composites with shape and strength recovery.

It should be understood that the examples and embodiments described herein are for illustrative purposes only and that various modifications or changes in light thereof will be suggested to persons skilled in the art and are to be included within the spirit and purview of this application.

We claim:

1. A shape-memory self-healing polymeric network (SM-SHP), comprising:
   thermally reversible repeating units comprising a Diels-Alder (DA) adduct between two linking units, wherein the linking units are independently selected from urethane units, and urea units;
   optionally, one or more other repeating units lacking the DA adduct between two of the linking units; and
   cross-linking repeating units lacking a thermally reversible unit, wherein the cross-linking units connect three or more chains by the linking units, wherein a majority of the chains comprise at least one of the thermally reversible repeating units,
   wherein a glass transition temperature ($T_g$) of the SMSHP is below an onset temperature where the DA adduct of the thermally reversible repeating units cleaves to two complementary functionalities, and
   wherein the DA adduct of the thermally reversible repeating units forms at temperatures between the $T_g$ and the onset temperature.

2. The SMSHP of claim 1, wherein the thermally reversible repeating unit is derived from the DA adduct of maleimide and furan.

3. The SMSHP of claim 1, wherein the chains between cross-linking units comprise a multiplicity of linking units.

4. A shape-memory self-healing polymeric network composite, wherein the shape-memory self-healing polymeric network (SMSHP) according to claim 1 comprises a matrix of a composite and a filler for the composite comprising particulates, fibers, fabrics, graphene, nanorods, nanotubes, and/or nanoplates of carbon, metals, metal oxides, ceramics, and/or organic polymers.

5. The shape-memory self-healing polymeric network composite of claim 4, wherein the fillers are fibers or fabrics of carbon.

6. A method of preparing a device comprising the SMSHP network of claim 1, comprising:
   providing a multiplicity of thermally reversible monomers that comprise a DA adduct and a pair of coupling functionalities;
   optionally, providing a multiplicity of other monomers lacking the thermally reversible adduct and a pair of the coupling functionality and/or a second coupling functionality complementary to the coupling functionalities;
   providing a multiplicity of cross-linking monomers lacking the thermally reversible adduct and comprising a multiplicity of the coupling functionalities and/or the second coupling functionalities;
   combining the thermally reversible monomers, the cross-linking monomers, and, optionally, the other monomers as a liquid at a temperature below an onset temperature where the DA adduct cleaves to dieneophile and diene functionalities, promoting reaction between the coupling functionalities or between the coupling functionalities and the second coupling functionality to form linking units between thermally reversible repeating units from the thermally reversible monomers, cross-linking repeating units from the cross-linking monomers, and, optionally other repeating units from the other monomers to form a device comprising a SMSHP network.

7. The method of claim 6, wherein the device is a molded part, and the reaction is a step-growth addition polymerization and the liquid is a melt of the thermally reversible monomers, the cross-linking monomers, and, optionally, the other monomers.

8. The method of claim 6, wherein the device is a coating and the reaction is a step-growth addition polymerization or a step-growth condensation polymerization having a volatile by-product of the condensation, and wherein the liquid is a melt of the thermally reversible monomers, the cross-linking monomers, and, optionally, the other monomers, or the liquid is a solution further comprising a volatile solvent.

9. The method of claim 6, wherein the thermally reversible monomers comprise one or more diols of the structure:

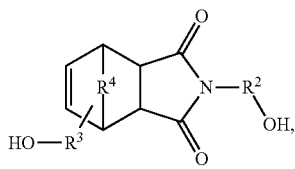

wherein: $R^2$ and $R^3$ are linear, branched, or cyclic $C_1$-$C_{20}$ alkylene groups, optionally interrupted by one or more oxygen, carbonyl, ester, and/or $[Si(CH_3)_2O]_zSi(CH_3)_2$ groups; and $R^4$ is O, $CH_2$, $C_2H_4$, NH, $CH_2NH$, where the $R^3OH$ group is substituted for any hydrogen of the thermally reversible monomer derived from a diene of the structure:

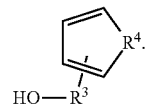

10. The method of claim 9, wherein the thermally reversible monomer is

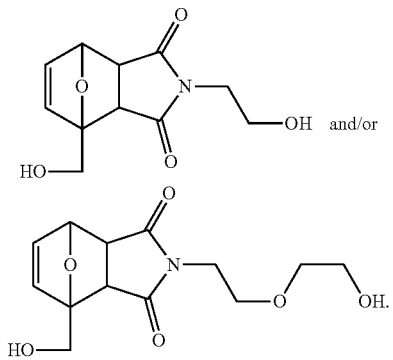

11. The method of claim 10, wherein the cross-linking monomer is triethanolamine (TEA) and/or N,N,N',N'-tetrakis(hydroxypropyl)ethylenediamine (HPED).

12. The method of claim 10, wherein the other monomer is hexamethylene diisocyanate.

13. The method of claim 10, wherein the second coupling functionality of the cross-linking monomer is an isocyanate functionality.

14. A thermally repairable device, comprising a SMSHP network according to claim 1.

15. The thermally repairable device of claim 14, wherein the device is a molded part.

16. The thermally repairable device of claim 15, wherein the device is a coating.

* * * * *